United States Patent
Mattes

(10) Patent No.: US 10,878,274 B2
(45) Date of Patent: *Dec. 29, 2020

(54) SYSTEMS AND METHODS OF IMAGE PROCESSING FOR REMOTE VALIDATION

(71) Applicant: Jumio Corporation, Palo Alto, CA (US)

(72) Inventor: Daniel Mattes, Wels (AT)

(73) Assignee: Jumio Corporation, Palo Alto, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 15/689,389

(22) Filed: Aug. 29, 2017

(65) Prior Publication Data

US 2018/0082145 A1 Mar. 22, 2018

Related U.S. Application Data

(63) Continuation of application No. 13/968,164, filed on Aug. 15, 2013, now abandoned.
(Continued)

(51) Int. Cl.
*G06Q 20/40* (2012.01)
*G06K 9/46* (2006.01)
(Continued)

(52) U.S. Cl.
CPC ............ *G06K 9/46* (2013.01); *G06K 9/20* (2013.01); *G06Q 20/409* (2013.01); *G06T 1/0007* (2013.01); *G06T 2207/30168* (2013.01)

(58) Field of Classification Search
CPC .... G06Q 20/042; G06Q 40/02; G06Q 20/409; G06K 9/46; G06K 9/20; G06T 1/0007; G06T 2207/30168
See application file for complete search history.

(56) References Cited

U.S. PATENT DOCUMENTS

| 5,930,767 A | 7/1999 | Reber et al. |
|---|---|---|
| 6,363,380 B1 | 3/2002 | Dimitrova |

(Continued)

FOREIGN PATENT DOCUMENTS

| CN | 102298781 | * 8/2011 | ............... G06T 7/60 |
|---|---|---|---|
| EP | 2048615 A1 | 4/2009 | |

(Continued)

OTHER PUBLICATIONS

Denman, "Improved Detection and Tracking of Objects in Surveillance Video", 2009. (Year: 2009).*

(Continued)

*Primary Examiner* — Kito R Robinson
*Assistant Examiner* — Abdulmajeed Aziz
(74) *Attorney, Agent, or Firm* — Morgan, Lewis & Bockius LLP

(57) ABSTRACT

The various embodiments described herein include methods, devices, and systems for remote document validation. In one aspect, a method is performed at a server system and includes: (1) receiving video stream data representing a document, where: (a) the data includes timing information that indicates when the video images were captured, and (b) the data captures characteristics of the document; (2) determining, based on the data, that the document comprises a first type of document; (3) assessing the characteristics, including for each characteristic: (a) determining whether verification criteria for the characteristic has been satisfied; and (b) updating an aggregate assessment score for the document based on the determination; (4) after assessing the characteristics, determining whether the aggregate assessment score satisfies a validity threshold; (5) determining whether the video stream was captured within a predefined threshold; and (6) providing an authorization indicator based (Continued)

on the aggregate assessment score and the timing information.

13 Claims, 11 Drawing Sheets

Related U.S. Application Data

(60) Provisional application No. 61/683,623, filed on Aug. 15, 2012.

(51) Int. Cl.
*G06K 9/20* (2006.01)
*G06T 1/00* (2006.01)

(56) References Cited

U.S. PATENT DOCUMENTS

| | | | |
|---|---|---|---|
| 6,726,094 | B1 | 4/2004 | Rantze et al. |
| 7,912,785 | B1 | 3/2011 | Kay |
| 7,953,671 | B2 | 5/2011 | Bishop et al. |
| 7,978,900 | B2 | 7/2011 | Nepomniachtchi et al. |
| 8,189,664 | B2 | 5/2012 | Socek et al. |
| 8,543,823 | B2 | 9/2013 | Carr |
| 8,688,579 | B1* | 4/2014 | Ethington .......... G06Q 20/0425 705/42 |
| 9,449,217 | B1 | 9/2016 | Thirimachos et al. |
| 9,584,510 | B2 | 2/2017 | Stuntebeck et al. |
| 2003/0018897 | A1 | 1/2003 | Bellis, Jr. et al. |
| 2005/0156046 | A1* | 7/2005 | Goldenberg ............. G06K 7/10 235/462.13 |
| 2008/0306839 | A1 | 12/2008 | Starrs |
| 2009/0092294 | A1 | 4/2009 | Uchida |
| 2010/0008535 | A1 | 1/2010 | Abulafia |
| 2010/0048242 | A1 | 2/2010 | Rhoads |
| 2010/0150458 | A1 | 6/2010 | Angell |
| 2011/0313918 | A1 | 12/2011 | Lawson et al. |
| 2012/0230577 | A1* | 9/2012 | Calman ................ G06Q 20/042 382/138 |
| 2013/0024300 | A1* | 1/2013 | Choudhuri ........... G06Q 30/018 705/16 |
| 2013/0085935 | A1* | 4/2013 | Nepomniachtchi .. G06Q 20/322 705/40 |
| 2013/0335554 | A1 | 12/2013 | Brunner |
| 2014/0020058 | A1 | 1/2014 | White et al. |
| 2014/0254891 | A1 | 9/2014 | Deok et al. |
| 2015/0046711 | A1 | 2/2015 | Slaby et al. |
| 2015/0319170 | A1 | 11/2015 | Grossemy |
| 2015/0365361 | A1 | 12/2015 | Tomlinson |
| 2016/0063235 | A1 | 3/2016 | Tussy |
| 2016/0162729 | A1 | 6/2016 | Hagen et al. |
| 2017/0019400 | A1 | 1/2017 | Drolshagen et al. |
| 2017/0124386 | A1 | 5/2017 | Long |
| 2018/0182057 | A1 | 6/2018 | Corcoran |

FOREIGN PATENT DOCUMENTS

| | | |
|---|---|---|
| JP | 2005284565 A | 10/2005 |
| KR | 10-1472845 B1 | 12/2014 |
| KR | 10-1680598 B1 | 12/2016 |
| KR | 10-2017-0029301 A | 3/2017 |
| WO | WO2017-043314 A1 | 3/2017 |

OTHER PUBLICATIONS

Cucchiara, "Detecting Moving Objects, Ghosts and Shadows in Video Streams", 2003. (Year: 2003).*
Diez, Patricia, "Digital Identification by Drone—Electronic Identification," Jul. 5, 2016, URL:https://www.electronicid.eu/identification-digital-or-dron/.
Diez, Patricia, "Why is Video Identification more secure than Face-to-Face Identification?," May 3, 2017, URL:https://www.electronicid.eu/video-identificaton-vid-secure-face-face-identification/.
Grassi, Paul A. et al., "Digital Identity Guidelines," National Institute of Stadards and Technology, Jun. 22, 2017, retrieved from https://nvlpubs.nist.gov/nistpubs/SpecialPublicatios/NIST.SP.800-63-3.pdf.
Grassi, Paul A. et al., "Digital Identity Gudelines: Enrollment and Identity Proofing," National Institute of Standards and Tehcnology, Jun. 22, 2017, retrieved from https://nvlpubls.nist.gov/nistpubs/Special Publications/NIST.SP.800-63A.pdf.
Grassi, Paul A. et al., "Digital Identity Guidelines: Authentication and Lifecycle Management," National Institute of Standards and Technology, Jun. 22, 2017, retrieved from https://nvlpubs.nist.gov/nistpubs/Special Publications/NIST.SP.800-63b.pdf.
Grassi, Paul A. et al., "Digital Identity Guidelines: Federation and Assertions," National Institue of Standards and Techology, Jun. 22, 2017, retrieve from https://nvlpubs.nist.gov/nistpubs/SpecialPublications/NIST/SP.800-63C.pdf.
Jumio Inc., Extended European Search Report, EP18187949.5, dated Apr. 3, 2019, 12 pgs.
Jumio Inc., International Search Report and Written Opinion, PCT/US2018045839, dated Dec. 31, 2018, 12 pgs.
Anonymous: "How to Authenticate Credit Cards in Face-to-Face Transactions," Jul. 2, 2011, retrieved from the Internet: http://web.archive.org/web/20120720084453/htto://, 5 pgs.
Anonymous: "Merchant Tips & FACQs," Oct. 7, 2008, retrieved from the Internet: http://web.archive.org/web/20081007232740/http://www.usbank.com/cgi_w/cfm/small_business/products_and_services/merchant_payment/merchant_faqs.cfm, 5 pgs.
Jumio Inc., Communication Pursuant to Rules 161(2) and 162 EPC, EP13753752.8, dated Mar. 24, 2015, 3 pgs.
Jumio Inc., Communication Pursuant to Rules 70(2) and 70a(2) EPC, EP13753752.8, dated Mar. 15, 2016, 1 pg.
Jumio Inc., Extended European Search Report, EP13753752.8, dated Feb. 26, 2016, 8 pgs.
Jumio Inc., Communication Pursuant to Article 94(3) EP13753752.8, dated Feb. 14, 2017, 7 pgs.
Jumio Inc., International Search Report and Written Opinion, PCT/US2013/055195, dated Mar. 6, 2014, 9 pgs.
Jumio Inc., International Preliminary Report on Patentability, PCT/US2013/055195, dated Feb. 17, 2015,8 pgs.
Ryan Kim, "Gigaom/Junio says use your webcam to swipe credit cards," Jul. 26, 2011, retrieved from the Internet: https://gigaom.com/2011/07/26/jumio-says-use-your-webcam-to-swipe-credit-cards/, 6 pgs.

* cited by examiner

SYSTEMS AND METHODS OF IMAGE PROCESSING FOR REMOTE VALIDATION

TECHNICAL FIELD

The present disclosure generally relates to video processing analysis, including but not limited to, assessing the authenticity of remote documents using video processing analysis.

BACKGROUND

Online transactions are vulnerable to security breaches and various forms of fraud. In particular, one of the problems with a typical online verification process is that it circumvents customary signature and identification verification protocols that take place during an in-person transaction. For example, during a typical online transaction, a contracting party provides a contract (e.g., an order form) that requires the other party to enter identification data such a name, a billing address, a telephone number, and document details. The other party enters and sends the data requested in the form over the internet or some other data connection. The contracting party verifies that the information is valid and that the transaction can be processed. However, the identification data and document details provided by the other party may have been acquired illicitly. The contracting party is not able to reliably verify that the individual providing the identification data and document details is the true owner of the information. Additionally, the contracting party is not able to reliably verify that the individual providing the document details has physical possession of the actual document, or assess whether such a document is authentic or a counterfeit.

By contrast, during an in-person transaction, the contracting party can request signed photo identification in order to verify that the person tendering the document is the true owner. The contracting party can then compare the signatures on the document against the signature on the picture identification, and also verify that the other party is the same person shown on the picture identification. Moreover, the possibility that picture identification may be requested serves as a potential deterrent against using an illicitly acquired document during an in-person transaction. And in some cases, contracting personnel learn to recognize the names and faces of frequent customers. Additionally, given the nature of the transaction, the contracting party can visually and physically inspect the document offered to assess whether the document is authentic or a counterfeit.

SUMMARY

Systems, methods, and devices described herein enable the enhancement of the security of online transactions by assessing the authenticity of documents using video processing analysis. Implementations of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to assess the authenticity of documents.

For example, in some implementations, systems, methods, and devices are operable to assess various characteristics (e.g. variations of shadows, surface reflectivity, holograms, security features, color gradients, aspect ratios, thickness and/or length measurements, etc.) of credit cards from video data provided by a user. Additionally and/or alternatively, one or more card characteristics captured during an online transaction may be compared against one or more of the same characteristics available in a card database indexed and/or otherwise searchable by card issuer, and which stores credit card characteristics for a number of cards provided by various credit card issuers (e.g. banks, etc.). Additionally and/or alternatively, one or more card characteristics captured during an online transaction may be compared against one or more of the same characteristics captured during previous transaction(s) to verify that the credit card being used during a transaction matches the card with the same information (i.e. credit card number) from previous transaction(s). Additionally and/or alternatively, a voice print record and/or location information may be combined with the use of the encoded and/or encrypted video data to provide additional security. Additionally and/or alternatively, images of signatures, electronic signatures and/or other biometric information may be combined with the use of the encoded and/or encrypted video data to provide additional security.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, illustrate only some example features of the present disclosure and are therefore not to be considered limiting, for the description may admit to other effective features.

Figure 1:
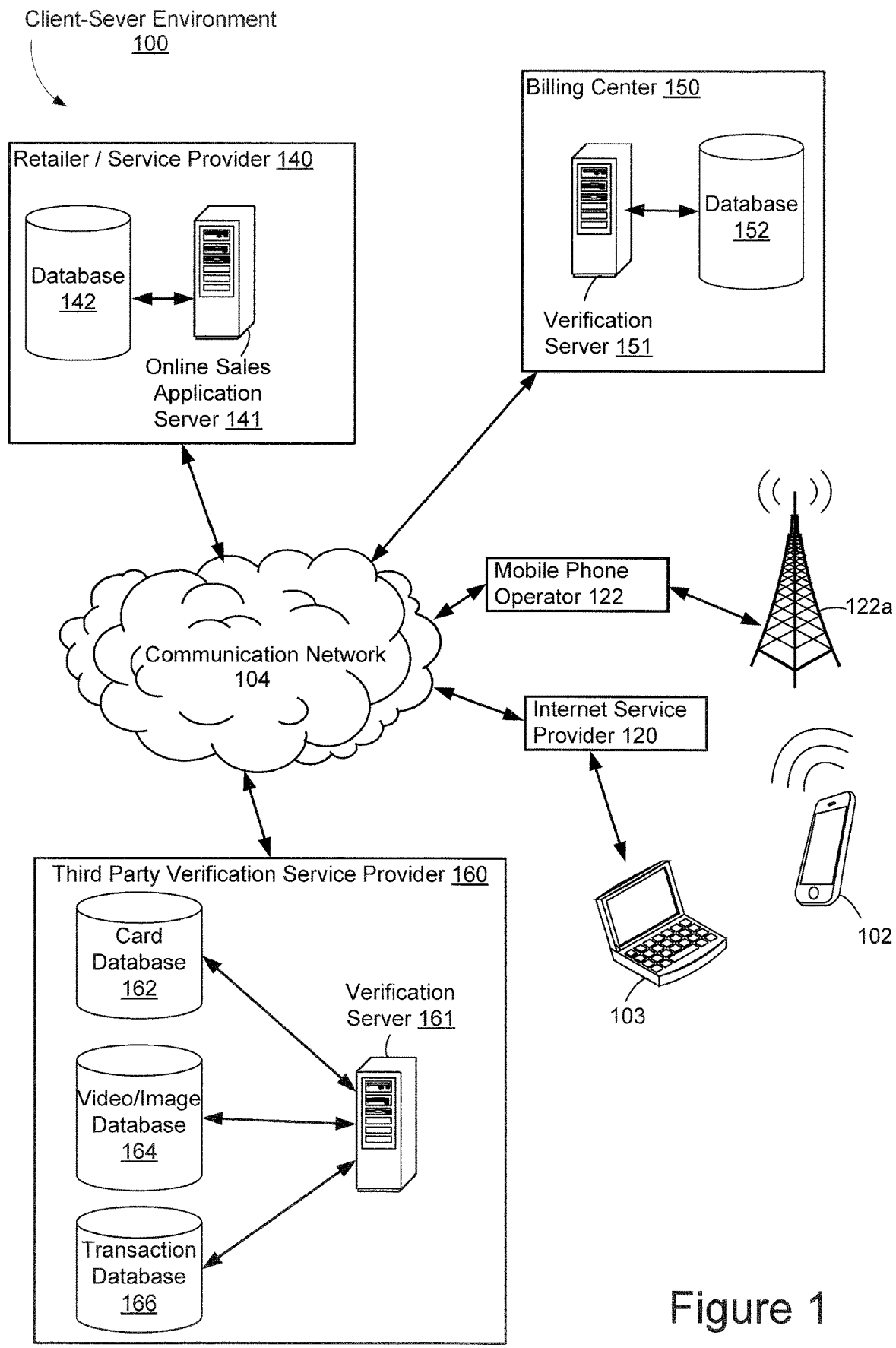
FIG. 1 is a block diagram of an example client-server environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

FIG. 1 is a block diagram of an example client-server environment 100. While certain example features are illustrated, those skilled in the art will appreciate from the present disclosure that various other features have not been illustrated for the sake of brevity and so as not to obscure more pertinent aspects of the implementations disclosed herein. To that end, the client-server environment 100 includes a billing center 150, a retailer/merchant (or service provider) 140, a third party verification service provider 160, a mobile phone operator 122 (i.e. wireless carrier), an internet service provider 120, and a communications network 104. Each of the billing center 150, the retailer 140, the third party verification service provider 160, the mobile phone operator 122, the internet service provider 120 are capable of being connected to the communication network 104 in order to exchange information with one another and/or other devices and systems. In some implementations, the mobile phone operator 122 and the internet service provider 120 are operable to connect client devices to the communication network 104 as well. For example, a smartphone 102 is operable with the network of the mobile phone operator 122, which includes for example, a base station 122a. Similarly, for example, a laptop computer 103 (or tablet, desktop, workstation or the like) is connectable to the network provided by the internet service provider 120, which is ultimately connectable to the communication network 104. Moreover, while FIG. 1 only includes one of each of the aforementioned devices and systems, those skilled in the art will appreciate from the present disclosure that any number of such devices and/or systems may be provided in a client-server environment, and particular devices may be absent. In other words, the client-server environment 100 is merely an example provided to discuss more pertinent features of the present disclosure.

The communication network 104 may be any combination of wired and wireless local area network (LAN) and/or wide area network (WAN), such as an intranet, an extranet, including a portion of the internet. In some implementations, the communication network 104 uses the HyperText Transport Protocol (HTTP) to transport information using the Transmission Control Protocol/Internet Protocol (TCP/IP). HTTP permits the client device 102 to access various resources available via the communication network 104. However, the various implementations described herein are not limited to the use of any particular protocol.

The retailer 140, for example, includes an online customer sales application server 141 and a database 142. In some implementations, the retailer 140 includes a local customer sales application, such as a point-of-sale terminal within a department store. The retailer 140 may be an online service provider (e.g. a gambling website, a social networking website, a dating website, etc.) or a retailer of real and/or digital goods (e.g. clothing, music, etc.).

In some implementations, the billing center 150 is associated with at least one credit company associated with a credit card, a debit card, or other payment instrument. The billing center 150 may be a computerized system holding information relating to client accounts, billing conditions and history, transactions history, and personal and other details of each client and/or of each credit card associated with the billing center 150. To that end, the billing center 150 includes a verification server 151 and a database 152. The billing center 150 may be associated with one or more credit companies, enabling the retrieval of data from one or more third party databases (not shown) including such information. For example, in order to execute and/or authorize transactions, the verification server 151 retrieves data from the database 152 to check authorization of a transaction according to predefined authorization rules followed by the billing center 151.

In some implementations, the third party verification service provider 160 is provided to enable the enhancement of the security of online financial transactions by assessing the authenticity of payment instruments, such as credit and debit cards, using video processing analysis. To that end, the third party verification service provider 160 is enabled to receive and analyze video data from a client device (e.g. the smartphone 102 or laptop computer 104), and includes a verification server 161, an optional user authentication card database 162, a video/image database 164, and a transactions database 166.

As discussed below in greater detail with reference to FIG. 2, client devices, such as the computer 103 and smartphone 102, include a display and a camera. A mobile application is operated at least in part by the client device. In some implementations, the client devices 102 and/or 103 are enabled to communicate with the billing center 150, the third party verification service provider 160, and the retailer 140. For example, the computer may include at least one of an Ethernet enabled network adapter or interface, a WiFi enabled network adapter or interface, a cable modem, a DSL modem, a cellular wireless device, or the like.

In operation, a user may use a client device 102/103 to access the online customer sales application server 141 provided by the retailer 140. In order to make a purchase through the online customer sales application, the camera associated with the client device is used to obtain at least video data including representations of the credit card, which is processed according to one of the various methods described below. Briefly, the video data is sent to the third party verification server provider 160 to assess the authenticity of the credit card presented by the user in the video data. In some implementations, the verification server 161 receives the video data and is enabled to assess various characteristics of the credit card from the video data provided by the user. For example, without limitation, the assessed characteristics include at least one of variations of shadows, surface reflectivity, holograms, security features, color gradients, aspect ratios, thickness measurements, and/ or length measurements obtainable from the video images. Moreover, to further ensure veracity of the video data, a timestamp and/or location data associated with the video data may be analyzed to ensure that the video data is current with respect to a particular transaction and/or that the location information associated with video data indicates a location proximate to where the user is purported to be based on an IP address or other information associated with the transaction. In other words, some implementations include inspecting one or more data fields included in the received video data to determine whether or not the video data was recorded within a time period proximate to the current process (e.g. 1-2 minutes) and/or whether the video data was recorded in a place proximate to where the user is purported to be. If the timestamp is not valid and/or the location information is questionable, the method includes taking remedial action or stopping the process altogether. For example, in some implementations a remedial action includes at least requesting additional video data. Additionally and/or alternatively, the rejected video data and any subsequently received video data may be compared to determine if there are any abnormalities or other signs of fraud on the process.

Additionally and/or alternatively, one or more card characteristics captured during an online transaction may be compared against one or more of the same characteristics available in the optional user authenticated card database 162. In some implementations, the optional user authenticated card database 162 is indexed and/or otherwise searchable by card number, and stores user authenticated credit card characteristics each card. In other words, the optional user authenticated card database 162 stores credit (and/or debit) card characteristics that can be used to validate cards issued to individual users. For example, as described below with reference to FIG. 6, each card may have precise colors, surfaces with precise reflectivity characteristics, optical security features (e.g. holograms), and precise arrangements of characters and/or information fields that can be measured and compared against cards offered by users with the same card number.

Additionally and/or alternatively, one or more card characteristics captured during an online transaction may be compared against one or more of the same characteristics captured during previous transaction(s) to verify that the credit card being used during a transaction matches the card with the same information (i.e. credit card number) from previous transaction(s). To that end, in some implementations the at least one of the video/image database 164 and the transactions database 166 can be used to store values representative of card characteristics obtained from previous transactions for a particular user card and/or actual portions of the video data received by the third part verification server provider 160.

Additionally and/or alternatively, a voice print record and/or location information may be combined with the use of the encoded and/or encrypted video data to provide additional security. Additionally and/or alternatively, images of signatures, electronic signatures and/or other biometric information may be combined with the use of the encoded and/or encrypted video data to provide additional security.

Figure 2:
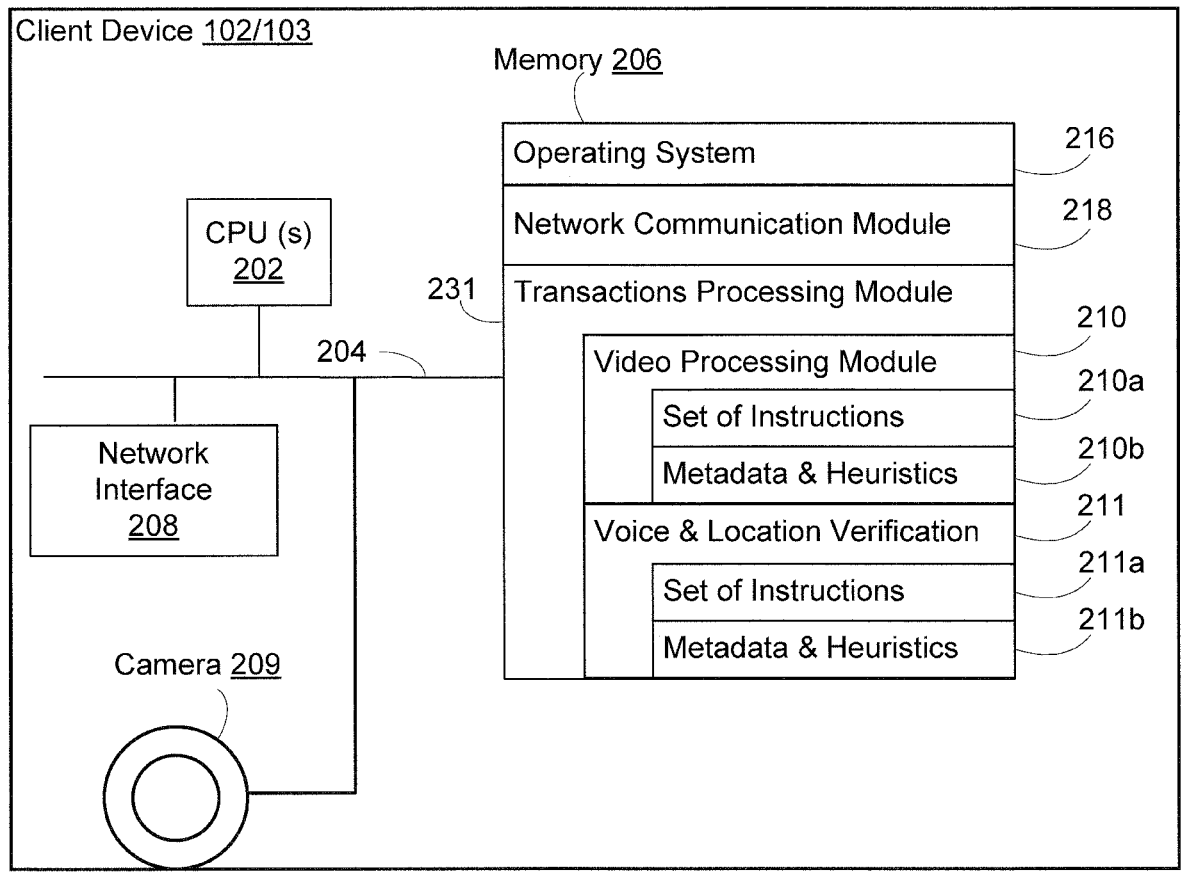
FIG. 2 is a block diagram of an example implementation of a client system.

FIG. 2 is a block diagram of an example implementation of a client device (e.g. smartphone 102) discussed above with reference to FIG. 1. Again, while certain specific features are illustrated, those skilled in the art will appreciate from the present disclosure that various other features have not been illustrated for the sake of brevity and so as not to obscure more pertinent aspects of the implementations disclosed herein. To that end, the client device 102/103 includes one or more processing units (CPU's) 202, one or more network or other communications interfaces 208, memory 206, a camera 209, and one or more communication buses 204 for interconnecting these and various other components. The communication buses 204 may include circuitry (sometimes called a chipset) that interconnects and controls communications between system components. The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, including the non-volatile and volatile memory device(s) within the memory 206, comprises a non-transitory computer readable storage medium.

In some implementations, the memory 206 or the non-transitory computer readable storage medium of the memory 206 stores the following programs, modules and data structures, or a subset thereof including an operating system 216, a network communication module 218, and a transactions processing module 231.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the internet, other wide area networks, local area networks, metropolitan area networks, and so on.

The transactions processing module 231 is configured to cooperate with instructions sent from a verification server (e.g. verification server 161). To that end, the transactions processing module 231 includes a video processing module 210 and an optional voice and location data verification module 211. The video processing module 210 facilitates the capture and encoding of video and/or image data to be sent to the verification server. To that end, the video processing module 210 includes a set of instructions 210*a* and heuristics and metadata 210*b*. Similarly, the voice and location data verification module 211 facilitates the capture and encoding of voice and location data requested by the verification server. To that end, the voice and location data verification module 211 includes a set of instructions 211*a* and heuristics and metadata 211*b*.

Figure 3:
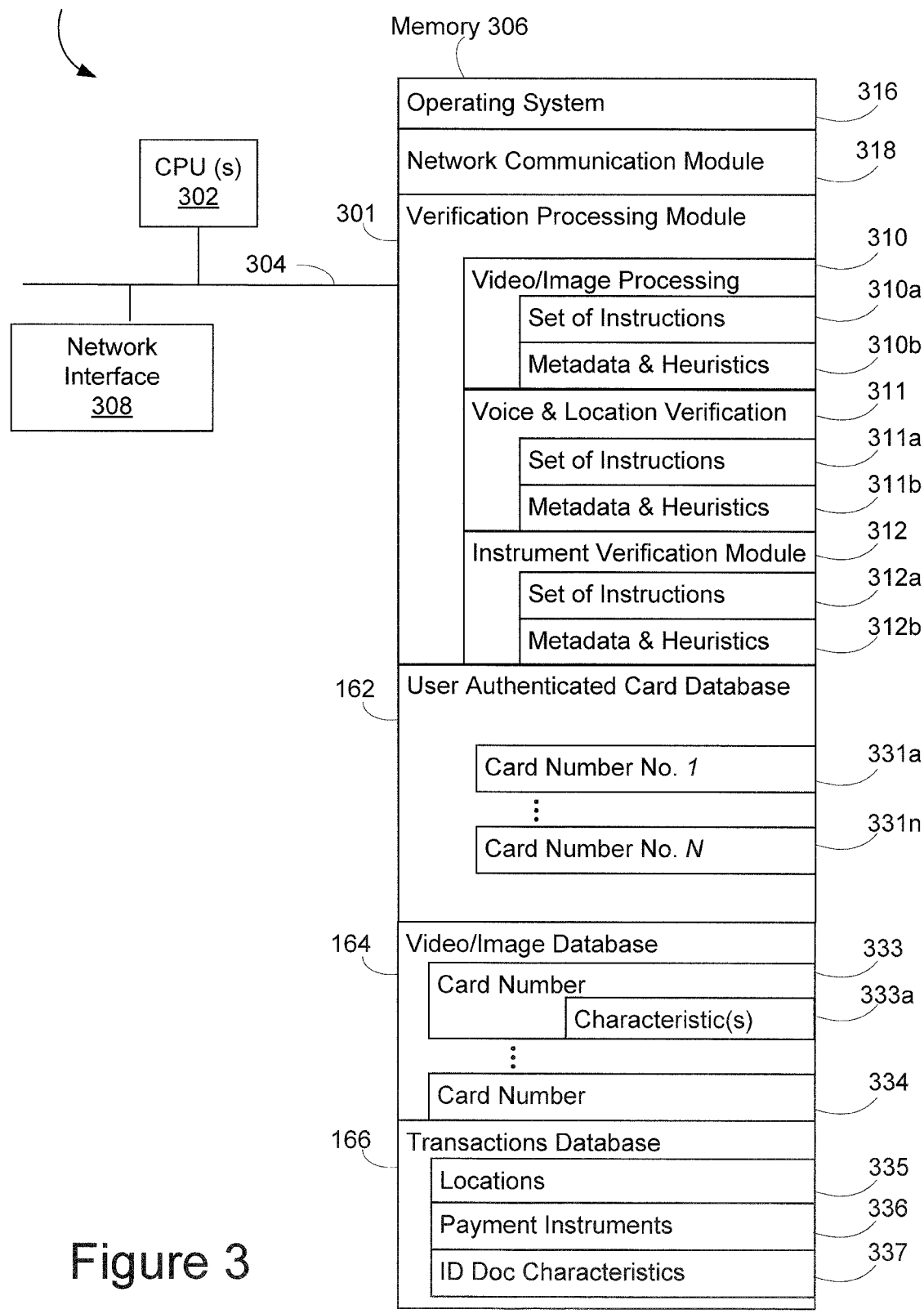
FIG. 3 is a block diagram of an example implementation of a server system.

FIG. 3 is a block diagram of an example implementation of a verification server system 151/161 (e.g. verification server 151 or 161). While certain specific features are illustrated, those skilled in the art will appreciate from the present disclosure that various other features have not been illustrated for the sake of brevity and so as not to obscure more pertinent aspects of the implementations disclosed herein. To that end, the server system 151/161 includes one or more processing units (CPU's) 302, one or more network or other communications interfaces 308, memory 306, and one or more communication buses 304 for interconnecting these and various other components. The communication buses 304 may include circuitry (sometimes called a chipset) that interconnects and controls communications between system components. The memory 306 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302. The memory 306, including the non-volatile and volatile memory device(s) within the memory 306, comprises a non-transitory computer readable storage medium. In some implementations, the memory 306 or the non-transitory computer readable storage medium of the memory 306 stores the following programs, modules, and data structures, or a subset thereof including an operating system 316, a network communication module 318, a verification processing module 301, an optional user authenticated card database 162, a video/image database 164, and a transactions database 166.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the internet, other wide area networks, local area networks, metropolitan area networks, and so on.

The verification processing module 301 includes video processing module 310 and an optional voice and location data verification module 311. The video processing module 310 facilitates the processing of video and/or image data received from the client device. To that end, the video processing module 310 includes a set of instructions 310a and heuristics and metadata 310b. Similarly, the voice and location data verification module 311 facilitates the processing of voice and location data received from the client device. To that end, the voice and location data verification module 311 includes a set of instructions 311a and heuristics and metadata 311b. The instrument verification module 312 facilitates the processing of instrument data received from the client device. To that end, the instrument verification module 312 includes a set of instructions 312a and heuristics and metadata 312b.

In some implementations, the optional user authenticated card database 162 is indexed and/or otherwise searchable by card number, and stores credit card characteristics for a number of cards on a per card basis. For example, as shown in FIG. 3, the optional user authenticated card database 162 includes card number data sets 331a, . . . , 331n. Each issuer card number data set includes a master or clean list of (and/or debit) card characteristics for a respective credit card obtained during a secure activation process involving the true user of the credit card. For example, the card number data set 331a includes credit card characteristics of the respective credit card issued to the true user, which are, in some implementations, obtained during a secure activation process involving the true user.

In some implementations, the video/image database 164 is indexed by credit card (and/or debit card) number, and stores values representative of card characteristics obtained from previous transactions for a particular user card and/or actual portions of the video data received by the third part verification server 151/161. For example, the record for credit card number 333 includes characteristics 334. Additionally and/or alternatively, in some implementations, the transactions database 166 stores data related to transaction locations 335, types of payment instruments used 336, and/or identification document characteristics 337.

Although FIG. 3 shows an example implementation of a server system, FIG. 3 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a server system and how features are allocated among them will vary from one implementation to another, and may depend in part on the amount of data traffic that the system must handle during peak usage periods as well as during average usage periods.

Figure 4:
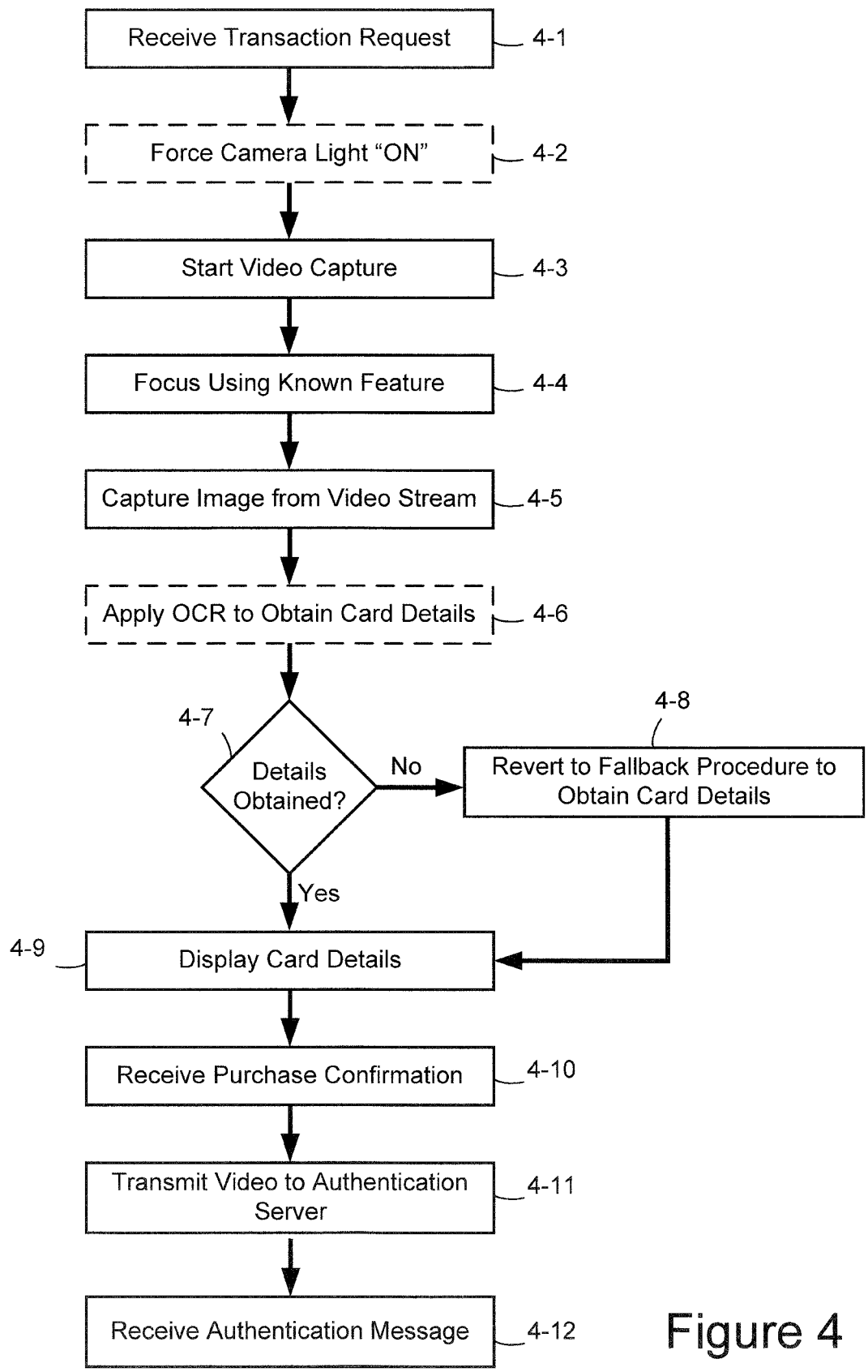
FIG. 4 is a flowchart representation of a client device method.

FIG. 4 is a flowchart representation of a client device method. In some implementations, the method is performed by a client device (e.g. smart-phone, tablet, laptop, personal computer, etc.), having an associated digital camera, in order to facilitate authentication of an online financial transaction. For example, with reference to FIG. 1, the method may be implemented on at least one of the two client devices 102 and 103 as a part of an online commerce client application. To that end, as represented by block 4-1, the method includes receiving a transaction request in which the user will present a credit or debit card to the camera associated with the client device. For example, an application running on the client device 103 detects when a user is attempting to complete a purchase by, for example, receiving an input from a web-browser and/or a sub-routine of the application operable to prompt a user for an input and subsequently receive an input indicative of the user attempting to make a purchase. In response to receiving the transaction request, as represented by block 4-2, the method optionally includes forcing a light into an "on" state so that the camera included on and/or associated with the client device is able to acquire well lit video data including a credit card (or debit card) presented by the user. As represented by block 4-3, the method includes starting the video capture process by activating the camera associated with the client device. As described in greater detail below with reference to FIG. 8, as represented by block 4-4, in some embodiments the method includes focusing the digital camera using a known feature, such as a logo or trademark. In some implementations, the method includes focusing the digital camera using a previously unknown feature, so that cards that have unknown and/or exotic features can be processed.

In response to sufficiently focusing the camera, as represented by block 4-5, the method includes capturing an image of the credit card presented by the user from the video stream produced by the digital camera. As represented by block 4-6, the method optionally includes applying an optical character recognition (OCR) technique to the image of the credit card in order to identify and extract the credit card details. One or more of the segments of the image may include characters relating to the credit card details (e.g. segment of each group of four to six numbers of the card number, another segment of the expiry date of the card and yet another segment of the name of the card holder). The image analysis may also include recognizing the characters in each identified segment. Additionally, the analysis may also include an optional verification process that includes verifying whether all pertinent segments have been identified and the relevant characters recognized. Additionally and/or alternatively, in some implementations, the image may be sent to a server, where the OCR process is applied to the image.

To that end, as represented by block 4-7, the method includes determining whether all of the pertinent credit card details have been obtained. If any of the pertinent credit card details are missing or could not be extracted from the image ("No" path from block 4-7), as represented by block 4-8, the method includes reverting to a fallback procedure to obtain the pertinent credit card details. On the other hand, if all of the pertinent credit card details have been extracted and/or otherwise provided by the user ("Yes" path from block 4-7), as represented by block 4-9, the method includes displaying at least some of the credit card details to the user on the client device 103. As represented by block 4-10, the method includes receiving a payment confirmation input from the user in response to displaying the credit card details. As represented by block 4-11, the method includes transmitting video data to the authentication or verification server as a part of an authentication request to enhance the security of the transaction. In some embodiments, the pertinent credit card details, extracted from the captured image and/or received from the user are also transmitted along with the video data at 4-11. As represented by block 4-12, the method includes receiving an authentication message indicating whether or not the transaction can/has been confirmed based on an authentication process in which the authenticity of the credit card presented was assessed.

Figure 5:
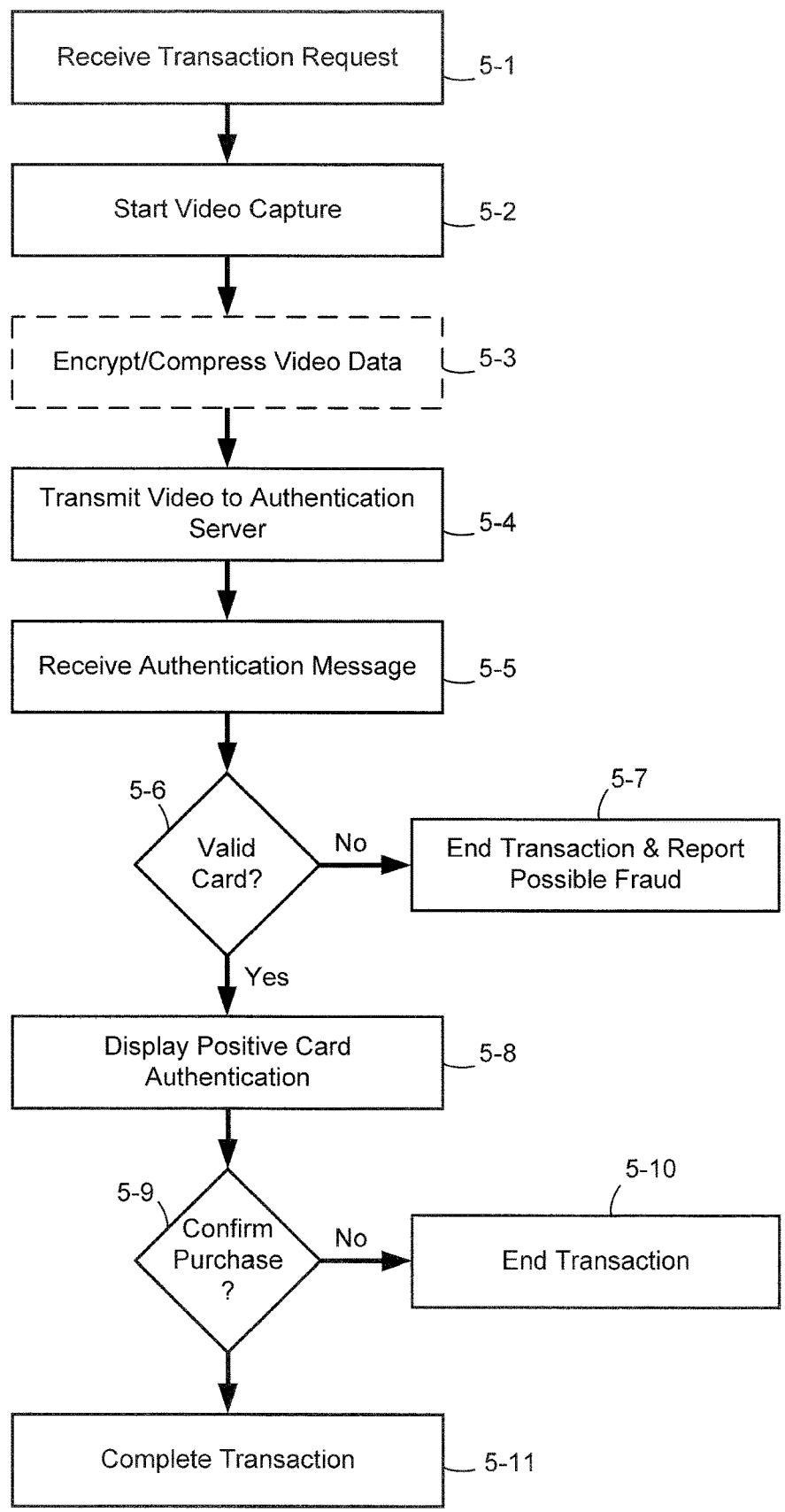
FIG. 5 is a flowchart representation of a client device method.

FIG. 5 is a flowchart representation of a client device method. As will be apparent, some of the steps described below are functionally the same or similar to those described in FIG. 4, and as such the description of the method has been truncated. For more details regarding these steps, one should refer to the description of FIG. 4. In some implementations, the method is performed by a client device (e.g. smartphone, tablet, laptop, personal computer, etc.) in order to facilitate authentication of an online financial transaction. For example, with reference to FIG. 1, the method may be implemented on at least one of the two client devices 102 and 103 as a part of an online commerce client application. To that end, as represented by block 5-1, the method includes receiving a transaction request in which the user will present a credit or debit card to the camera associated with the client device. In response to receiving the transaction request, as represented by block 5-2, the method includes starting the video capture process by activating the camera associated with the client device. Optionally any of the steps 4-4 through 4-9 are also performed. As represented by block 5-3, the method includes one of encrypting and compressing the video stream captured by the camera. As represented by block 5-4, the method includes transmitting the encrypted and/or compressed video data to an authentication server (i.e. verification server) as a part of an authentication request to enhance the security of the transaction. As represented by block 5-5, the method includes receiving an authentication message indicating whether or not the transaction can/has been confirmed based on an authentication process in which the authenticity of the credit card presented was assessed.

As represented by block 5-6, the method includes determining whether the authentication message indicates that the card presented by the user is likely to be valid based on the analysis of the credit card details and/or video data by the authentication server. If the authentication message indicates that the credit card is not likely authentic or that there is a question about the authenticity of the card ("No" path from block 5-6), as represented by block 5-7, the method includes ending the transaction and transmitting a message reporting a possible fraud to at least one of the card issuer and a security service. In some implementations, the method is implemented so as to use location based tracking available on a smartphone and/or IP address based tracking so that the fraud report includes an indication of where the suspected fraud is taking place. In some implementations, the use of location and/or IP address based tracking is concealed from the user of the client device. On the other hand, if the authentication message indicates that the credit card is likely authentic ("Yes" path from block 5-6), as represented by block 5-8, the method includes displaying a positive card authentication message to the user on the client device and prompting the user to confirm the transaction/purchase. Additionally and/or alternatively, in some implementations, the authentication message indicates that the card is likely authentic and that the transaction has been processed. As represented by block 5-9, the method includes determining whether or not the user has provided an input indicative of a transaction/purchase confirmation. If the user has not provided such an input within a threshold amount of time and/or if the user has provided an input indicative of cancelling the transaction/purchase, as represented by block 5-10, the method includes ending the transaction. On the other hand, if the user has provided an input indicative of a transaction/purchase confirmation ("Yes" path from block 5-9), as represented by block 5-11, the method includes completing the transaction/purchase by transmitting a confirmation message to one of the online retailer, the billing center, and/or the authentication server.

Figure 6:
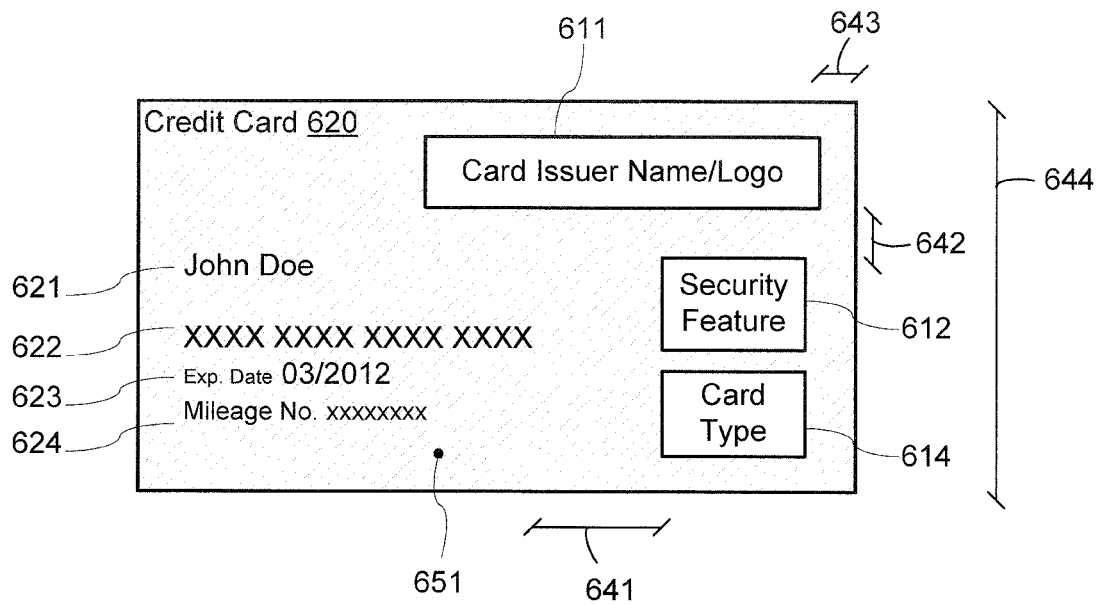
FIG. 6 is a schematic drawing of an example credit card.

FIG. 6 is a schematic drawing of an example credit card 620 provided to describe the various characteristics that may be identified from an image of a credit card. As is typical of a credit card, the credit card 620 may include a cardholder name 621 (i.e. the true authorized user of the card), a credit card number 622, an expiry date 623, a rewards number 624 (e.g. airline miles reward number or the like), a card issuer name or logo 611 (e.g. Bank of Somewhere), one or more security features 612 (e.g. a hologram), a logo for the card type 614 (e.g. VISA or MasterCard), and a background color and/or pattern 651. Additionally, the credit card may also include a Card Verification Value Code (CVV or CVC), which is typically printed or engraved one either the front or back surface of the card. Additionally, these features are typically arranged in a very precise way and have other precise characteristics associated with them, which can be checked to ensure that the credit card 620 is authentic.

For example, with respect to the cardholder name 621, the credit card number 622, the expiry date 623, the rewards number 624, the card issuer name/log 611, characteristics such as font size, spacing, color, shadows, reflections, reflectivity, thickness, and the like may be measured and compared against authenticated card characteristics and/or card characteristics obtained from prior transactions in order to determine differences or matches. Similarly, card measurements, such as the offset 643 of the card issuer name/logo 611 from the edge of the card, the spacing 642 between the card issuer name/logo 611, the spacing 641 between the credit card number 622 and the security feature 612, and the height 644 of the credit card may be measured from an image of the credit card 620, and compared against authenticated card characteristics and/or card characteristics obtained from prior transactions in order to determine differences or matches. Additionally and/or alternatively, the background 651 may include a distinctive color, a pattern, a watermark, a translucent security feature, etc., which may be evaluated to determine differences or matches as a part of the verification process.

Moreover, the aforementioned characteristics discussed are merely examples of some of the many characteristics that may be measured from images of a credit card (or other payment instrument or identification document). As such, those skilled in the art will appreciate from the present disclosure that numerous other characteristics may be considered and used for verification purposes.

Figure 7:
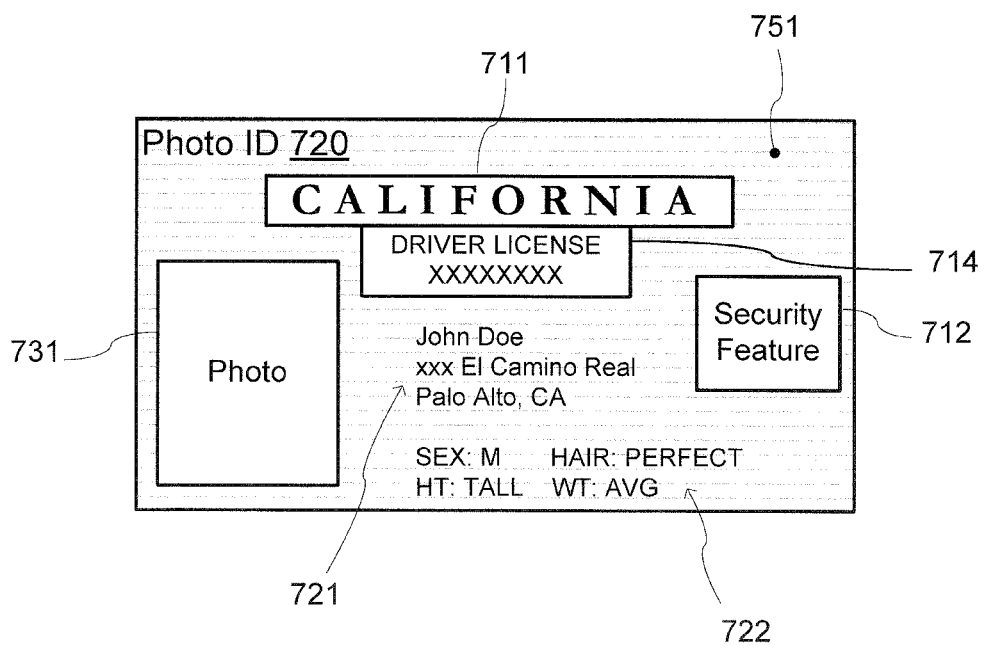
FIG. 7 is a schematic drawing of an example identification document/card.

FIG. 7 is a schematic drawing of an example driver license 720 (i.e. an identification card or document). Similar to the schematic of the credit card 620 of FIG. 6, the driver license 720 includes a number of characteristic features that are typical of a driver license or the like. For example, the driver license 720 includes a photo 731, an indicator of the jurisdiction 711, an indicator of the license 714, a security feature 712 (e.g. hologram or semi-transparent picture, etc.), first and second license holder information fields 721, 722, and a background color and/or pattern 751. Additionally and/or alternatively, characteristics such as a respective birth date, font size, spacing, color, shadows, reflections, reflectivity, thickness, and the like may be measured and compared against the identification issuer's verified specifications in order to determine differences or matches. As described above with reference to FIG. 6, each of these features, individually and/or in combination, may be evaluated from an image of the driver license 720 (or other identification document) sent from a client device to a verification server.

Figure 8:
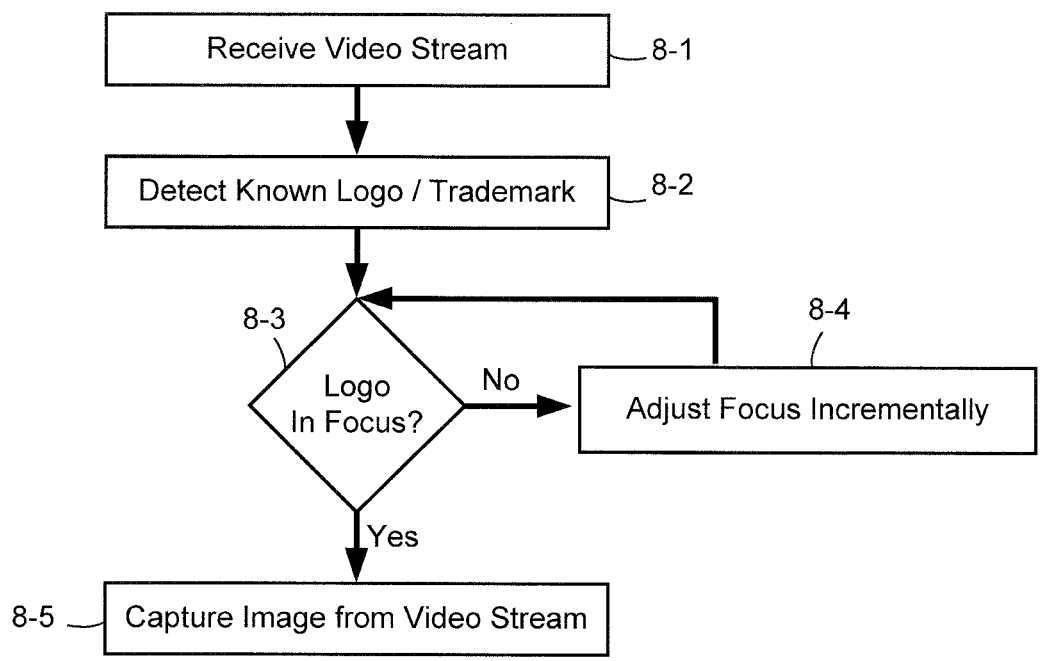
FIG. 8 is a flowchart representation of a machine vision method.

FIG. 8 is a flowchart representation of a machine vision method. In some implementations, the method is performed by a client device (e.g. smart-phone, tablet, laptop, personal computer, etc.) in order to facilitate authentication of an online financial transaction. For example, with reference to FIG. 1, the method may be implemented on at least one of the two client devices 102 and 103 as a part of an online commerce client application. To that end, as represented by block 8-1, the method includes receiving the video stream captured by the digital camera. As represented by block 8-2, the method includes detecting a known mark and/or a mark that is likely to be included on the surface of a credit card. For example, the mark may be a logo, a trademark indicating the type of credit card (e.g. VISA, Mastercard, American Express, etc.), a likely sequence of numbers and/or letters, a feature such as a smart-chip, etc. As represented by block 8-3, the method includes assessing whether the mark is in focus within a threshold range or other parameter. For example, assessing whether or not the mark is in focus may include, without limitation, comparing the detected mark against known marks stored in memory, and measuring the contrast between features included in the mark (e.g. measuring how sharp the lines are). If the mark is not in focus within a threshold or the like ("No" path from block 8-3), as represented by block 8-4, the method includes adjusting the focus incrementally and then re-assessing the focus of the mark. On the other hand, if the mark is determined to be in focus ("Yes" path from block 8-3), as represented by block 8-5, the method includes capturing and/or selecting an image from the video stream.

Figure 9:
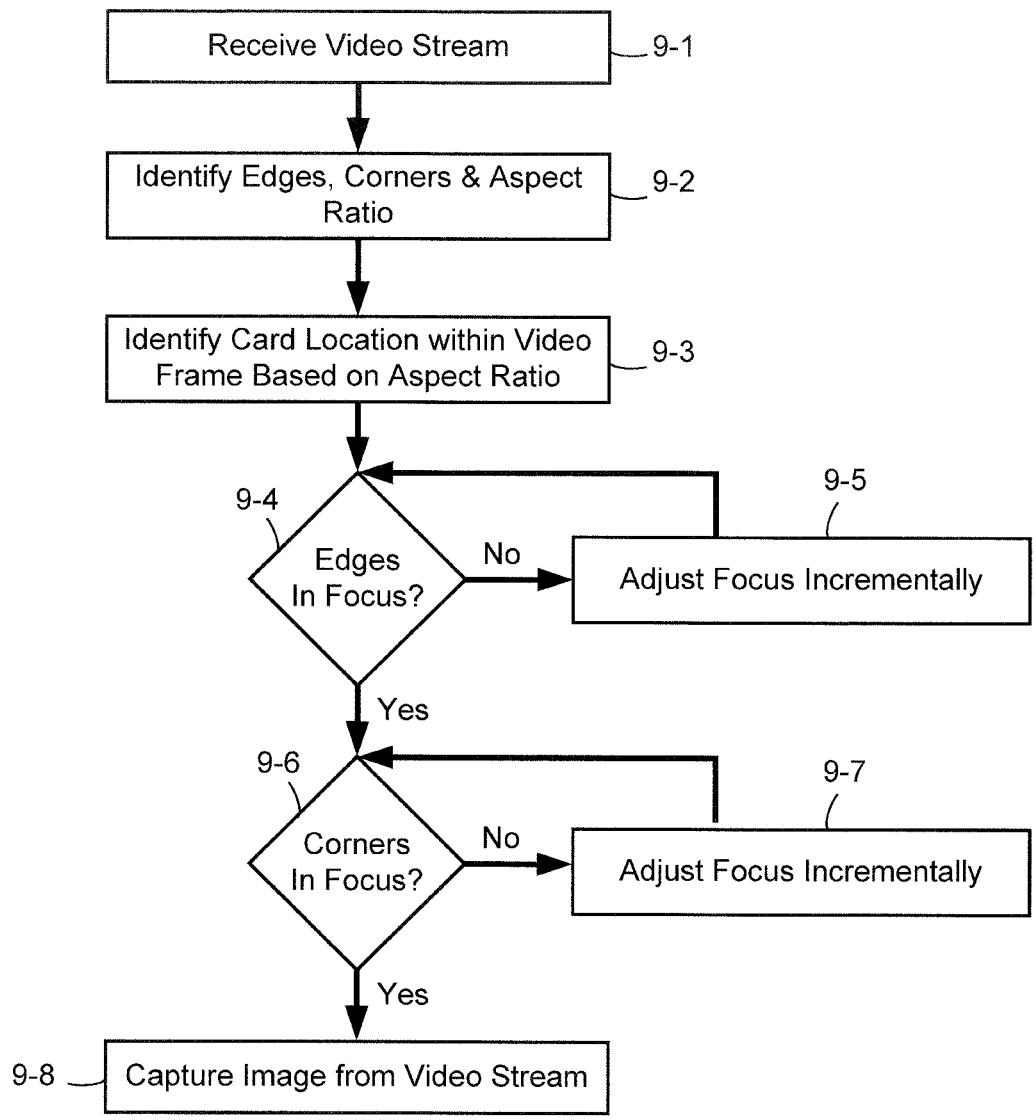
FIG. 9 is a flowchart representation of a machine vision method.

FIG. 9 is a flowchart representation of a machine vision method. In some implementations, the method is performed by a client device (e.g. smart-phone, tablet, laptop, personal computer, etc.) in order to facilitate authentication of an online financial transaction. For example, with reference to FIG. 1, the method may be implemented on at least one of the two client devices 102 and 103 as a part of an online commerce client application. To that end, as represented by block 9-1, the method includes receiving the video stream captured by the digital camera. As represented by block 9-2, the method includes identifying the edges, corners and aspect ratio of the card within the video stream. As represented by block 9-3, the method includes identifying a credit or debit card in the video stream based on an expected aspect ratio for the card.

As represented by block 9-4, the method includes assessing whether one or more of the edges of the card are in focus. If the edges of the card are not in focus within a threshold or the like ("No" path from block 9-4), as represented by block 9-5, the method includes adjusting the focus incrementally and then re-assessing the focus of the edges. In some implementations, the device may not allow incremental adjustment of the camera focus. As such, additionally and/or alternatively, in some implementations, the method includes triggering the autofocus of the camera on the area where the card is expected and/or estimated to be. On the other hand, if the edges are determined to be in focus ("Yes" path from block 9-4), as represented by block 9-6, the method includes assessing whether one or more of the corners are the card are in focus. If the corners are not n focus within a threshold or the like ("No" path from block 9-6), as represented by block 9-7, the method includes adjusting the focus incrementally and then re-assessing the focus of the corners. On the other hand, if the corners are determined to be in focus ("Yes" path from block 9-6), as represented by block 9-8, the method includes capturing an image from the video stream.

Figure 10:
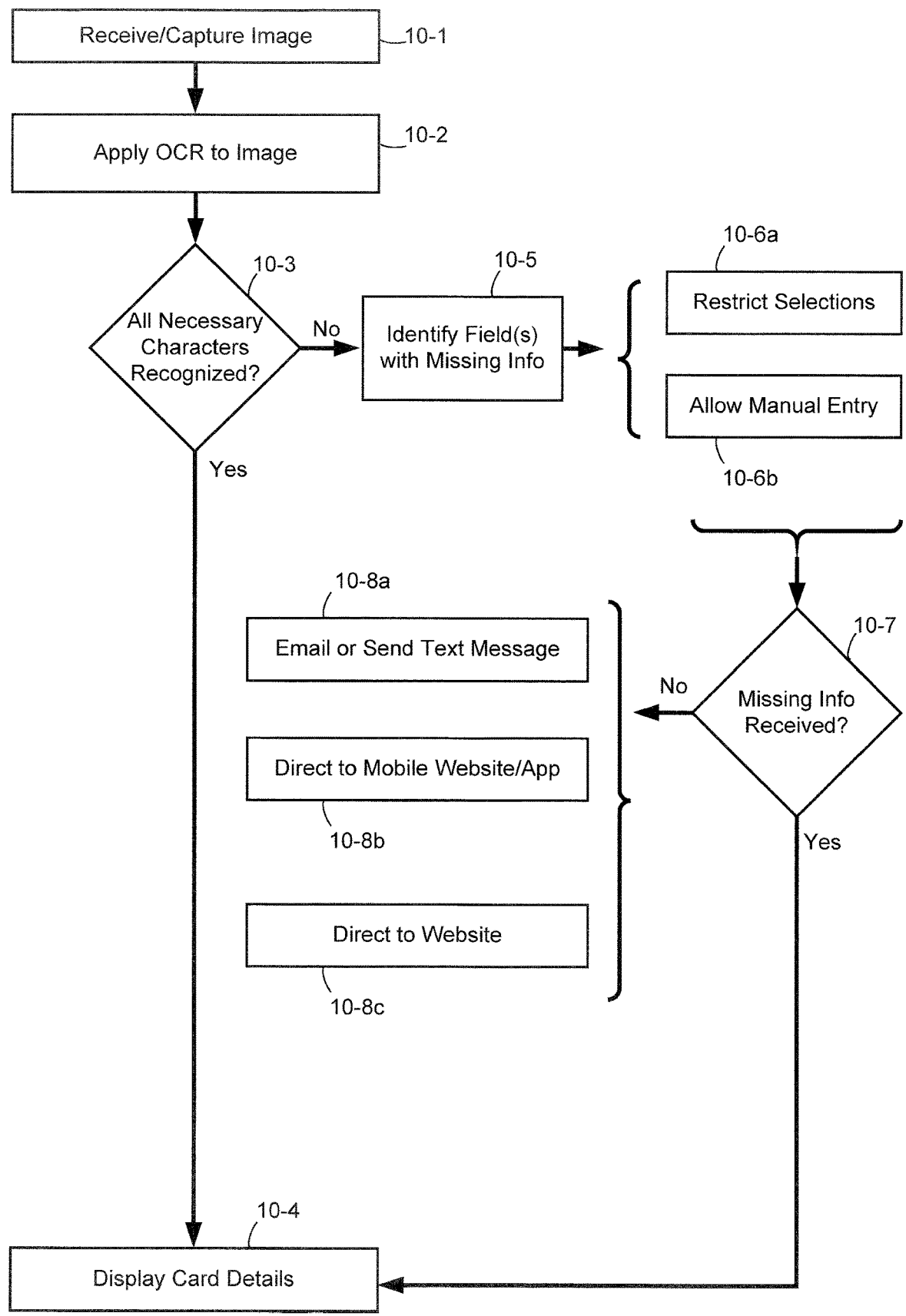
FIG. 10 is a flowchart representation of a machine vision method.

FIG. 10 is a flowchart representation of a machine vision method. In some implementations, the method is performed by a client device (e.g. smart-phone, tablet, laptop, personal computer, etc.) in order to facilitate authentication of an online financial transaction. For example, with reference to FIG. 1, the method may be implemented on at least one of the two client devices 102 and 103 as a part of an online commerce client application. To that end, as represented by block 10-1, the method includes receiving and/or capturing an image of a credit or debit card with a digital camera.

As represented by block 10-2, the method includes applying an OCR technique to the image of the credit card in order to identify and extract the credit card details. One or more of the segments of the image may include characters relating to the credit card details (e.g. segment of each group of four to six numbers of the card number, another segment of the expiry date of the card and yet another segment of the name of the card holder). The image analysis may also include recognizing the characters in each identified segment. Additionally, the analysis may also include an optional verification process that includes verifying whether all pertinent segments have been identified and the relevant characters recognized.

To that end, as represented by block 10-3, the method includes determining whether all of the pertinent credit card details have been obtained by determining if all the necessary characters have been recognized within a certainty estimate above a threshold. For example, in some implementations, a measurement of contrast may be used to estimate the certainty of the estimate. The certainty estimate would be greater if there is a high degree of contrast between the text and the background color. If all of the pertinent credit card details have been extracted and/or otherwise provided by the user ("Yes" path from block 10-3), as represented by block 10-4, the method includes displaying the credit card details to the user on the client device. On the other hand, if any of the pertinent credit card details are missing or could not be extracted from the image ("No" path from block 10-3), as represented by block 10-5, the method includes identifying the one or more character fields with missing and/or uncertain information.

In response to identifying the fields with the missing information, the method includes a number of fallback procedures that may be used to obtain the missing information. For example, as represented by block 10-6a, in some implementations, the method includes restricting the possible selections for the missing data to those selections that are likely or possible. For example, if the missing information is in the expiry date field, only future dates may be provided as selections. In another example, as represented by block 10-6b, in some implementations, the method includes allowing the user to manually enter the missing information while not allowing the user to tamper and/or change the information that was successfully extracted by the OCR process.

As represented by block 10-7, the method includes determining whether or not the missing information has been received using one or more of the fallback procedures. If all of the pertinent credit card details have been successfully provided by the user ("Yes" path from block 10-7), as represented by block 10-4, the method includes displaying the credit card details to the user on the client device. On the other hand, if the missing information has not been successfully retrieved by one of the fallback procedures ("No" path from block 10-7), the method includes a secondary set of fallback procedures. For example, as represented by block 10-8*a*, in some implementations, the method includes sending an email, text message and/or instant message to the client device prompting the user to provide the missing information by replying to the email or text message. In another example, in some implementations, as represented by block 10-8*b*, the method includes directing the client device application to a mobile website or application interface to re-enter the credit card details. In another example, in some implementations, as represented by block 10-8*c*, the method includes directing the client device application to a website to re-enter the credit card details.

Figure 11:
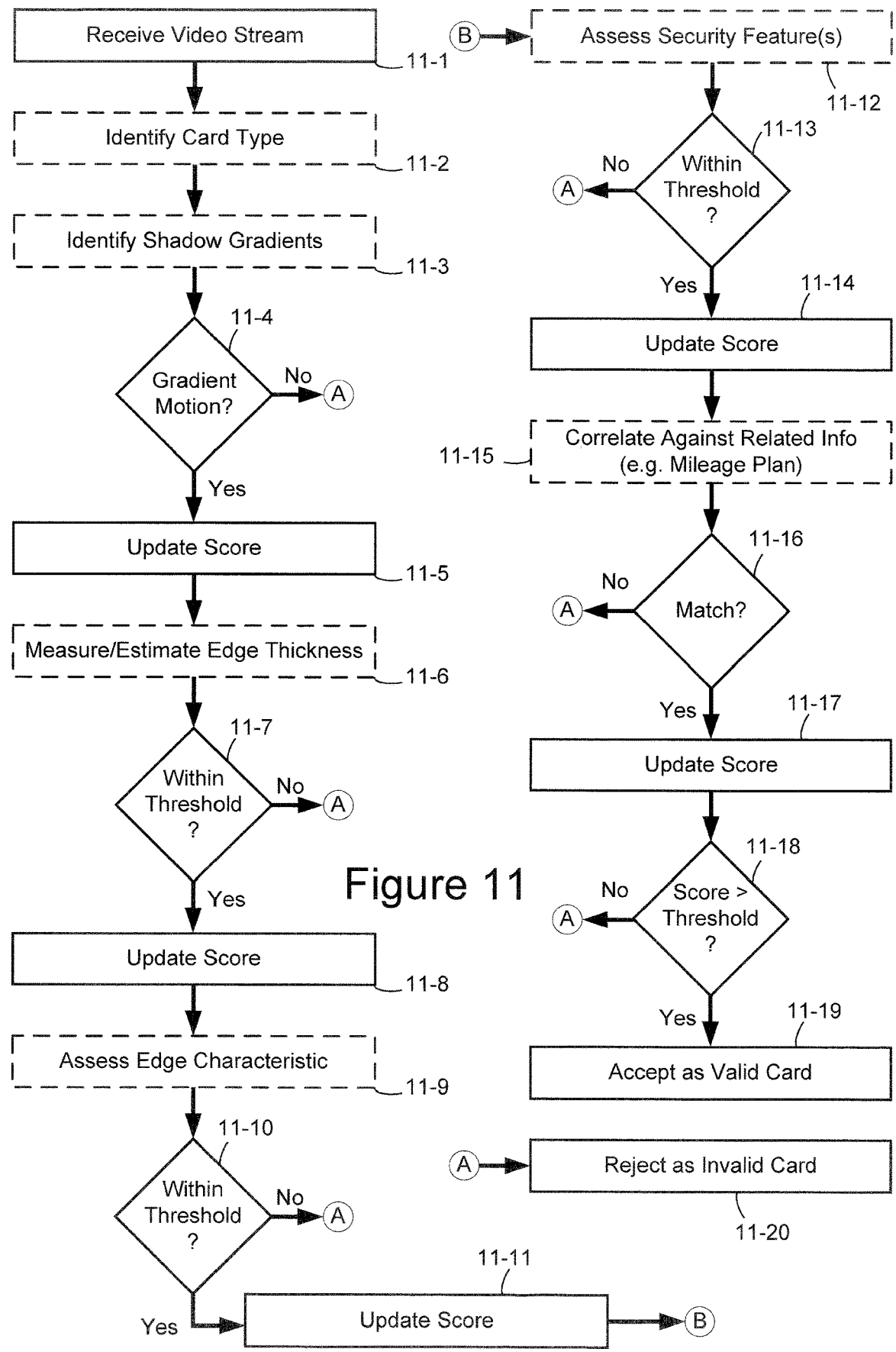
FIG. 11 is a flowchart representation of an authentication server method.

FIG. 11 is a flowchart representation of an authentication server method. In some implementations, the method is performed by a verification server system in order to facilitate authentication of an online financial transaction. For example, with reference to FIG. 1, the method may be implemented on at least one of the two verification servers 151 and 161. To that end, as represented by block 11-1, the method includes receiving video stream data from a client device. Then one or more characteristics of the payment instrument are identified from the received video data as described below. As represented by block 11-2, in some embodiments, the method includes identifying the card type shown in the video stream data. For example, the card type may be identified as either a credit card or a debit card. Additionally and/or alternatively, the card type may be identified as a specification type and/or brand of credit card issued by a particular issuer. Further the card type may be identified as a credit card with a particular prestige or membership level, etc. The card type may be determined by assessing whether or not the video stream data includes a mark that is identifiable by comparing a detected mark against known marks stored in memory, and measuring the contrast between features included in the mark. The card type may also be determining by looking up the credit card number to determine what the issuer indicates the card type to be.

In some embodiments in response to identifying the type of card represented in the video stream data, as represented by block 11-3, the method includes analyzing the video stream data to identify and track the change of shadow gradients across the surface of the card in the video stream data. In other embodiments, analyzing the video stream data to identify and track the change of shadow gradients across the surface of the card in the video stream data 11-3 occurs independently of identifying the card type 11-2. In yet other embodiments tracking shadow gradients 11-3 is optionally not included. As represented by block 11-4, the method includes determining whether or not the relative motion of the shadow gradients is consistent with the identified card type and/or that of a credit card in similar ambient lighting. In some implementations, when the lighting permits, the method includes measuring the shades of the embossed and/or printed digits on the credit card. Additionally and/or alternatively, the method includes measuring and/or otherwise characterizing the reflection "hotspots" (i.e., the brightest reflections within the video stream data) on the card. The shadows and/or hotspots need to move and/or change in manner consistent with the measured rotation of the card. In some implementations, the changes of a holographic image and/or a hologram on the card are assessed to determine whether the changes are consistent with the expected changes cause by the rotation of the card in space.

If the measured gradient motion is not within a threshold range indicative of the aforementioned consistency ("No" path from block 11-4), as represented by block 11-20, the method includes rejecting the card as invalid. Additionally and/or alternatively, in some implementations, instead of immediately rejecting the card as invalid, the method includes assessing one or more additional verification criteria to determine a composite verification score. In turn, the composite verification score can be assessed to determine whether or not to reject the card as invalid.

On the other hand, if the measured gradient motion is within the threshold range ("Yes" path from block 11-4), as represented by block 11-5, the method includes updating an assessment score. As represented by block 11-6, the method optionally includes measuring and/or estimating the edge thickness of the card in the video stream data. As represented by block 11-7, the method includes determining whether or not the measured/estimated edge thickness is consistent with the identified card type and/or that of a credit card in similar ambient lighting. If the edge thickness is not within a threshold range indicative of the aforementioned consistency ("No" path from block 11-7), as represented by block 11-20, the method includes rejecting the card as invalid. On the other hand, if the edge thickness is within the threshold range ("Yes" path from block 11-7), as represented by block 11-8, the method includes updating an assessment score.

As represented by block 11-6, the method optionally includes measuring and/or estimating the edge thickness of the card in the video stream data.

As represented by block 11-7, the method includes determining whether or not the measured/estimated edge thickness is consistent with the identified card type and/or that of a credit card in similar ambient lighting. If the edge thickness is not within a threshold range indicative of the aforementioned consistency ("No" path from block 11-7), as represented by block 11-20, the method includes rejecting the card as invalid. On the other hand, if the edge thickness is within the threshold range ("Yes" path from block 11-7), as represented by block 11-8, the method includes updating the assessment score.

As represented by block 11-9, the method optionally includes assessing one or more characteristics of the edge of the card, such as, without limitation, the color gradient of the edge of the card. As represented by block 11-10, the method includes determining whether or not the measured/estimated edge characteristic is consistent with the identified card type and/or that of a credit card in similar ambient lighting. If the edge characteristic is not within a threshold range indicative of the aforementioned consistency ("No" path from block 11-10), as represented by block 11-20, the method includes rejecting the card as invalid. On the other hand, if the edge characteristic is within the threshold range ("Yes" path from block 11-10), as represented by block 11-11, the method includes updating the assessment score.

As represented by block 11-12, the method optionally includes assessing one or more security features on the card (e.g. holograms, digital watermarks, etc.) in the video stream data. As represented by block 11-13, the method includes determining whether or not the one or more security features are consistent with the identified card type and/or that of a credit card in similar ambient lighting. If the security features are not within a threshold range indicative of the aforementioned consistency ("No" path from block 11-13), as represented by block 11-20, the method includes rejecting the card as invalid. On the other hand, if the security features are within the threshold range ("Yes" path from block 11-13), as represented by block 11-14, the method includes updating the assessment score.

As represented by block 11-15, the method optionally includes identifying and correlating information on the card in the video stream data against related information, such as, without limitation, a mileage plan number included on the face of the card. As represented by block 11-16, the method includes determining whether or not there is a match based on the correlation (e.g. determining that the mileage plan number is associated with the name on the card based on third party information). If the related information does not match ("No" path from block 11-16), as represented by block 11-20, the method includes rejecting the card as invalid. On the other hand, if there is a match ("Yes" path from block 11-16), as represented by block 11-17, the method includes updating the assessment score.

As represented by block 11-18, the method includes determining whether the updated assessment score satisfies a threshold level indicative of an assessment score for a valid credit card. Specifically, in some embodiments, the one or more identified characteristics described with respect to 11-2 through 11-17 above, are each compared to a corresponding verified characteristic, and together they are used produce an assessment score for the payment instrument. Then at 11-18, the method includes determining whether the assessment score satisfies a validity threshold. In some embodiments, the one or more identified characteristics are compared to corresponding verified characteristics in order to determine whether there is a match based at least on one or of the more matching rules described with respect to 11-2 through 11-17. In some implementations, the assessment score comparison is based on verified characteristics which include authenticated card characteristics and/or card characteristics obtained from prior transactions in order to determine differences or matches. For example, in some implementations, an assessment threshold is generated that is fitted to a first set of transactions (e.g., the first $10 k in transactions) and/or authenticated card characteristics obtained from the user in a secure initialization process. The generated assessment threshold is then used for a number of subsequently transactions (e.g., the next $1 k in transactions). Subsequently, the assessment threshold is updated on a sliding transactions window basis (e.g., using the previous $10 k in transactions), and so on. If the assessment score does not satisfy the threshold ("No" path from block 11-18), as represented by block 11-20, the method includes rejecting the card as invalid. On the other hand, if the assessment score satisfies the threshold ("Yes" path from block 11-18), as represented by block 11-19, the method includes accepting the card as valid.

Figure 12:
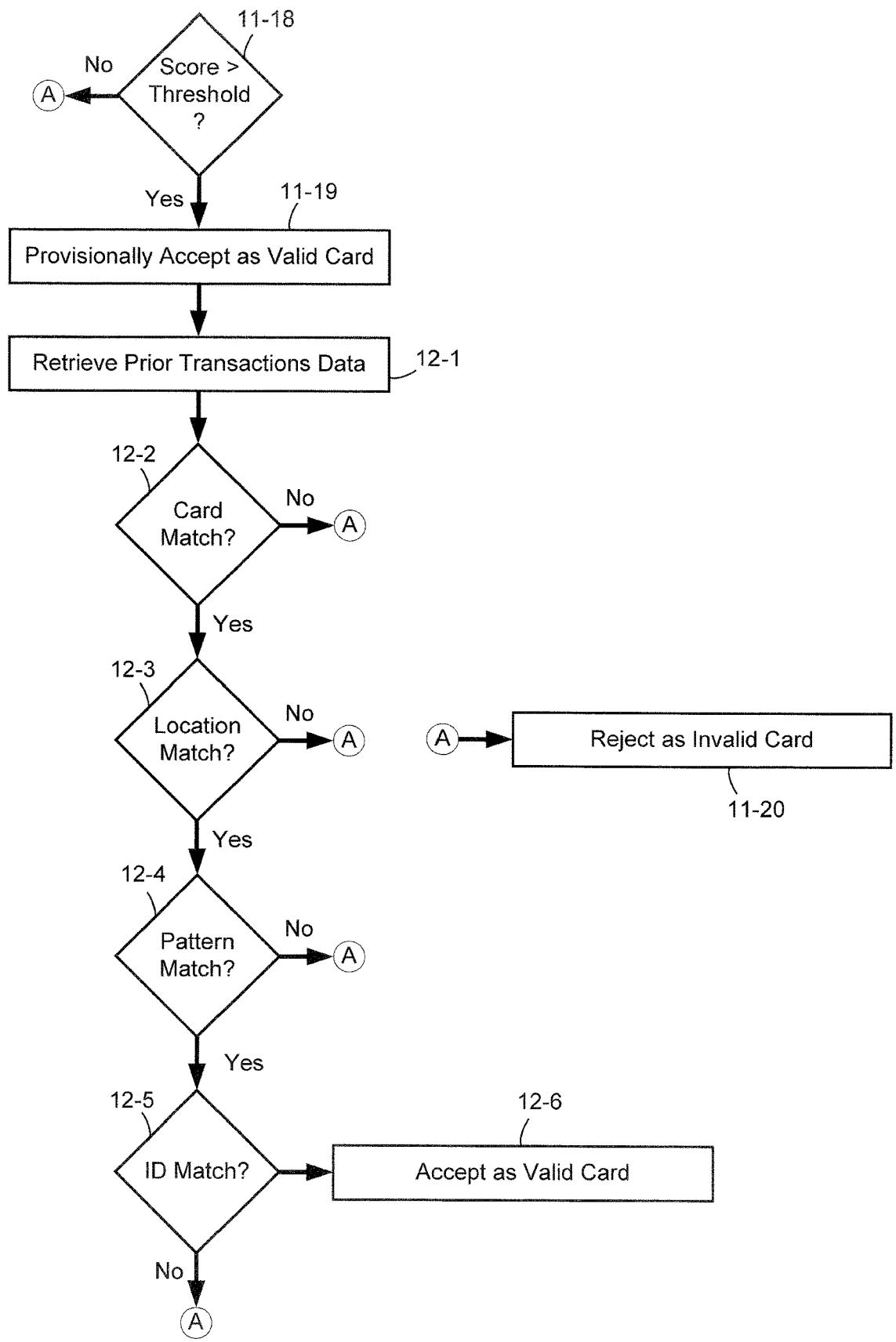
FIG. 12 is a flowchart representation of an authentication server method.

FIG. 12 is a flowchart representation of an authentication server method. In some implementations, the method is performed by a client device (e.g. smart-phone, tablet, laptop, personal computer, etc.) in order to facilitate authentication of an online financial transaction. For example, with reference to FIG. 1, the method may be implemented on at least one of the two verification servers 151 and 161. Moreover, the server method of FIG. 12 may be provided as an extension to the method provided in FIG. 11. To that end, with reference to FIGS. 11 and 12, the method includes determining whether the updated assessment score satisfies a threshold level indicative of an assessment score for a valid credit card. If the assessment score satisfies the threshold ("Yes" path from block 11-18), as represented by block 11-19, the method includes provisionally accepting the card as valid.

As represented by block 12-1, the method includes retrieving from a database (e.g. the transactions database 166 of FIG. 1) prior transactions data associated with the credit card. In some implementations, the prior transactions data includes not only the credit card number but also one or more indicators of the physical and/or optical characteristics of the credit card from previous transactions. For example, characteristics such as color, surface reflectivity, measurements between characters, and the respective arrangement and positions of trademarks and/or security features may be used. As represented by block 12-2, the method includes determining whether the card in the video stream data matches the prior transactions data. If the card does not match the prior transaction data ("No" path from block 12-2), as represented by block 11-20, the method includes rejecting the card as invalid. On the other hand, if the card matches the prior transaction data ("Yes" path from block 12-2), as represented by block 12-3, the method includes assessing whether the credit card transaction is occurring in an acceptable location or if the location is out of the ordinary for the card holder. If the card does not match the prior location data ("No" path from block 12-3), as represented by block 11-20, the method includes rejecting the card as invalid. On the other hand, if the card matches the prior location data ("Yes" path from block 12-3), as represented by block 12-4, the method includes assessing whether the type of transaction matches the card holder's typical spending habits or if the purchase is out of the ordinary for the card holder. If the card does not match the prior spending habits ("No" path from block 12-4), as represented by block 11-20, the method includes rejecting the card as invalid. On the other hand, if the card matches the prior spending habits ("Yes" path from block 12-4), as represented by block 12-5, the method includes assessing whether the card holder has presented valid identification and/or user credentials. If the user has not provided valid identification ("No" path from block 12-5), as represented by block 11-20, the method includes rejecting the card as invalid. On the other hand, if the user has provided valid identification ("Yes" path from block 12-5), as represented by block 12-6, the method includes accepting the card as valid and approving the use of the card for the transaction.

Various aspects of implementations within the scope of the appended claims are described above. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory may store a subset of the modules and data structures identified above. Furthermore, memory may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for enhancing the security of online transactions by assessing an authenticity of a document that is remote using video processing analysis, the computer-implemented method comprising:
  receiving, by one or more processors at a server system and from a camera of a client device, encrypted video stream data representing a document that is indicative of either a physical payment card or physical identification card which is used to authorize the document and authenticate a current online transaction, wherein:
    the video stream data includes a video stream and a timestamp that indicates when the video stream was captured, and
    the video stream data captures two or more characteristics of the document;
  determining, by the one or more processors and based on the video stream data, that the document comprises a first type of document of a plurality of document types;
  in accordance with the determination that the document comprises the first type of document, assessing, by the one or more processors, the two or more characteristics, including assessing a first characteristic that includes determining whether a change in a relative motion of a shadow gradient across a surface of the document as the document is rotated is consistent with a measured comparison to the first type of document under matching ambient lighting conditions, and accessing a second characteristic selected from a group consisting of:
    a surface reflectivity of the document;
    a hologram of the document;
    a color gradient of the document;
    an aspect ratio of the document;
    an edge thickness of the document; and
    a length of the document;
  wherein assessing the first and the second characteristic of the two or more characteristics includes:
    comparing, by the one or more processors, the first characteristic to a corresponding previously-captured and verified characteristic of the first type of document in a database to determine whether verification criteria for the first characteristic have been satisfied;
    comparing, by the one or more processors, the second characteristic to a corresponding previously-captured and verified characteristic of the first type of document in the database to determine whether verification criteria for the second characteristic have been satisfied; and
    updating, by the one or more processors, an aggregate assessment score for the document based on the determination as to whether the verification criteria for the first and second characteristic have been satisfied;
  after assessing the two or more characteristics, determining, by the one or more processors, whether the aggregate assessment score satisfies a validity threshold;
  determining, by the one or more processors and based on the time stamp, whether the video stream was captured within a predefined threshold of a current time; and
  providing, by the one or more processors, an authentication message based on the aggregate assessment score satisfying the validity threshold and the determination that the video stream was captured within the predefined threshold of the current time, including, in accordance with a determination that the change in the relative motion of the shadow gradient across the surface of the document as the document is rotated is not consistent with the measured comparison to the first type of document under matching ambient light conditions, rejecting the document as invalid, wherein:
    the authentication message indicates that the current online transaction cannot be authorized in response to determining that the updated assessment score does not satisfy the validity threshold; and
    the authentication message indicates that the current online transaction is authorized in response to determining that the undated assessment score does satisfy the validity threshold.

2. The method of claim 1, further comprising:
prior to receiving the encrypted video stream data, receiving a transaction request; and
transmitting a request for the video stream data in response to receiving the transaction request.

3. The method of claim 2, wherein the transaction request is received from a second server system distinct from the server system and the client device.

4. The method of claim 1, further comprising initiating a remedial process in accordance with a determination that the video stream was not captured within the predefined threshold to the current time.

5. The method of claim 1, further comprising prior to providing the authentication message, obtaining location information for the client device.

6. The method of claim 5, further comprising:
determining, based on the location information, that the client device does not match acceptable location data of the client device; and
initiating a fraud report including the location information as an indication of where suspected fraud is taking place.

7. The method of claim 1, further comprising:
acquiring an image from the video stream data; and
obtaining document data from the image by applying an optical character recognition technique.

8. A server system, comprising:
one or more processors; and
memory storing one or more programs comprising instructions which, when executed by the one or more processors, cause the one or more processors to perform a set of operations, comprising:
  receiving, from a camera of a client device, encrypted video stream data representing a document that is indicative of either a physical payment card or physical identification card which is used to authorize the document and authenticate a current online transaction, wherein:
    the video stream data includes a video stream and a timestamp that indicates when the video stream was captured, and
    the video stream data captures two or more characteristics of the document;
  determining, based on the video stream data, that the document comprises a first type of document of a plurality of document types;
  in accordance with the determination that the document comprises the first type of document, assessing the two or more characteristics, including assessing a first characteristic that includes determining, whether a change in a relative motion of a shadow gradient across a surface of the document as the document is rotated is consistent with a measured comparison to the first type of document under matching ambient lighting conditions, and accessing a second characteristic selected from a group consisting of:
    a surface reflectivity of the document;
    a hologram of the document;
    a color gradient of the document;
    an aspect ratio of the document;
    an edge thickness of the document; and
    a length of the document;
  wherein assessing the first and the second characteristic of the two or more characteristics includes:
    comparing the first characteristic to a corresponding previously-captured and verified characteristic of the first type of document in a database to determine whether verification criteria for the first characteristic have been satisfied;
    comparing the second characteristic to a corresponding previously-captured and verified characteristic of the first type of document in the database to determine whether verification criteria for the second characteristic have been satisfied; and
    updating an aggregate assessment score for the document based on the determination as to whether the verification criteria for the first and second characteristic have been satisfied;
  after assessing the two or more characteristics, determining whether the aggregate assessment score satisfies a validity threshold;
  determining, based on the timestamp, whether the video stream was captured within a predefined threshold of a current time; and
  providing an authentication message based on the aggregate assessment score satisfying the validity threshold and the determination that the video stream was captured within the predefined threshold of the current time, including, in accordance with a determination that the change in the relative motion of the shadow gradient across the surface of the document as the document is rotated is not consistent with the measured comparison to the first type of document under matching ambient light conditions, rejecting the document as invalid, wherein:
    the authentication message indicates that the current online transaction cannot be authorized in response to determining that the updated assessment score does not satisfy the validity threshold; and
    the authentication message indicates that the current online transaction is authorized in response to determining that the updated assessments core does satisfy the validity threshold.

9. The server system of claim 8, wherein the one or more programs further comprise instructions for, prior to providing the authentication message, checking location information associated with the video stream data; and
wherein the authentication message is based at least in part on an assessment of the location information.

10. The server system of claim 8, wherein the one or more programs further comprise instructions for:
initiating a remedial process to request additional video stream data in response to determining that the aggregate assessment score does not satisfy the validity threshold; and
initiating the remedial process to request additional video stream data in accordance with a determination that the video stream was not captured within the predefined threshold to the current time.

11. A non-transitory computer readable storage medium storing one or more programs, the one or more programs comprising instructions for:
receiving, from a camera of a client device, encrypted video stream data representing a document that is indicative of either a physical payment card or physical identification card which is used to authorize the document and authenticate a current online transaction, wherein:
  the video stream data includes a video stream and a timestamp that indicates when the video stream was captured, and the video stream data captures two or more characteristics of the document;
determining, based on the video stream data, that the document comprises a first type of document of a plurality of document types;
in accordance with the determination that the document comprises the first type of document, assessing the two or more characteristics, including assessing a first characteristic that includes determining, whether a change in a relative motion of a shadow gradient across a surface of the document as the document is rotated is consistent with a measured comparison to the first type of document under matching ambient lighting conditions, and assessing a second characteristic selected from a group consisting of:
 a surface reflectivity of the document;
 a hologram of the document;
 a color gradient of the document;
 an aspect ratio of the document;
 an edge thickness of the document; and
 a length of the document;
wherein assessing the first and the second characteristic of the two or more characteristics includes:
 comparing the first characteristic to a corresponding previously-captured and verified characteristic of the first type of document in a database to determine whether verification criteria for the first characteristic have been satisfied;
 comparing the second characteristic to a corresponding previously-captured and verified characteristic of the first type of document in the database to determine whether verification criteria for the second characteristic have been satisfied; and
 updating an aggregate assessment score for the document based on the determination as to whether the verification criteria for the first and second characteristic have been satisfied;
after assessing the two or more characteristics, determining whether the aggregate assessment score satisfies a validity threshold;
determining, based on the timestamp, whether the video stream was captured within a predefined threshold of a current time; and
providing an authentication message based on the aggregate assessment score satisfying the validity threshold and the determination that the video stream was captured within the predefined threshold of the current time, including, in accordance with a determination that the change in the relative motion of the shadow gradient across the surface of the document as the document is rotated is not consistent with the measured comparison to the first type of document under matching ambient light conditions, rejecting the document as invalid, wherein:
 the authentication message indicates that the current online transaction cannot be authorized in response to determining that the updated assessment score does not satisfy the validity threshold; and
 the authentication message indicates that the current online transaction is authorized in response to determining that the updated assessments core does satisfy the validity threshold.

12. The non-transitory computer readable storage medium of claim 11, wherein the one or more programs further comprise instructions for, prior to providing the authentication message, checking location information associated with the video stream data; and
 wherein the authentication message is based at least in part on an assessment of the location information.

13. The non-transitory computer readable storage medium of claim 11, wherein the one or more programs further comprise instructions for:
 initiating a remedial process to request additional video stream data in response to determining that the updated assessment score does not satisfy the validity threshold; and
 initiating the remedial process to request additional video stream data in accordance with a determination that the video stream data were not captured within the predefined threshold to the current time.

* * * * *

UNITED STATES PATENT AND TRADEMARK OFFICE
CERTIFICATE OF CORRECTION

PATENT NO. : 10,878,274 B2
APPLICATION NO. : 15/689389
DATED : December 29, 2020
INVENTOR(S) : Mattes Page 1 of 1

It is certified that error appears in the above-identified patent and that said Letters Patent is hereby corrected as shown below:

In the Claims

Claim 4, Column 19, Line 11, please delete "comprising initiating" and insert --comprising: initiating--;

Claim 5, Column 19, Line 15, please delete "comprising prior" and insert --comprising: prior--;

Claim 11, Column 22, Line 21, please delete "assessments core" and insert --assessment score--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*